L. T. WILKINS.
CHOPPING WHEEL.
APPLICATION FILED JAN. 5, 1916.

1,216,033.

Patented Feb. 13, 1917.

Witnesses

Inventor
L. T. Wilkins
By
Attorneys

UNITED STATES PATENT OFFICE.

LESLIE T. WILKINS, OF LAUREL, MONTANA.

CHOPPING-WHEEL.

1,216,033. Specification of Letters Patent. Patented Feb. 13, 1917.

Application filed January 5, 1916. Serial No. 70,448.

*To all whom it may concern:*

Be it known that I, LESLIE T. WILKINS, a citizen of the United States, residing at Laurel, in the county of Yellowstone, State of Montana, have invented certain new and useful Improvements in Chopping-Wheels; and I do hereby declare the following to be a full, clear, and exact description of the invention, such as will enable others skilled in the art to which it appertains to make and use the same.

The present invention is directed to improvements in chopping wheels, especially designed for blocking beets or the like, and has for its object to construct a device of this character which is extremely simple, strong and will effectively block the rows of growing plants.

A further object of the invention is to provide a chopping wheel of novel form which will be rotated as the supporting frame is propelled across the field.

With these and other objects in view, this invention resides in the novel features of construction, formation, combination and arrangement of parts to be hereinafter more fully described, claimed and illustrated in the accompanying drawing, in which:—

Figure 1:
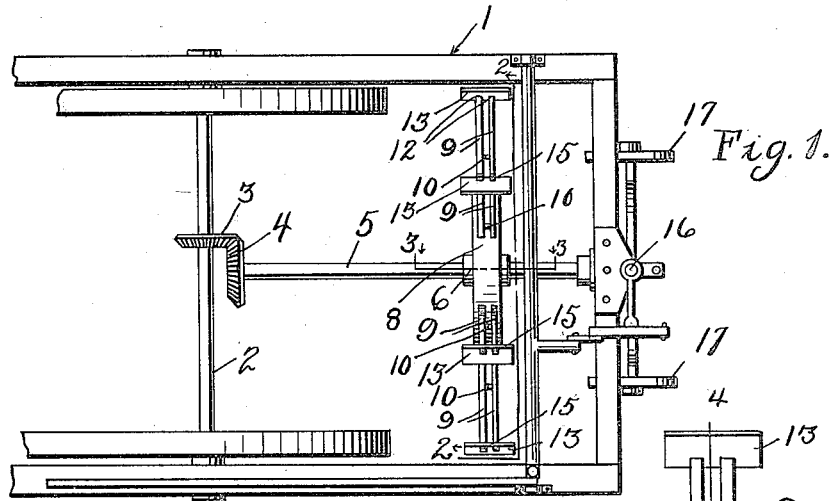
Figure 1 is a plan view of the wheel, showing it attached to the frame.
Figure 2:
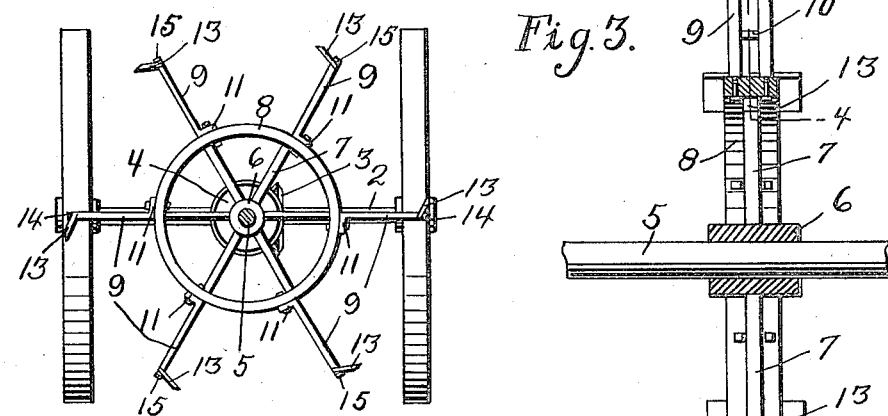
Fig. 2 is a sectional view on line 2—2 of Fig. 1.
Figure 3:
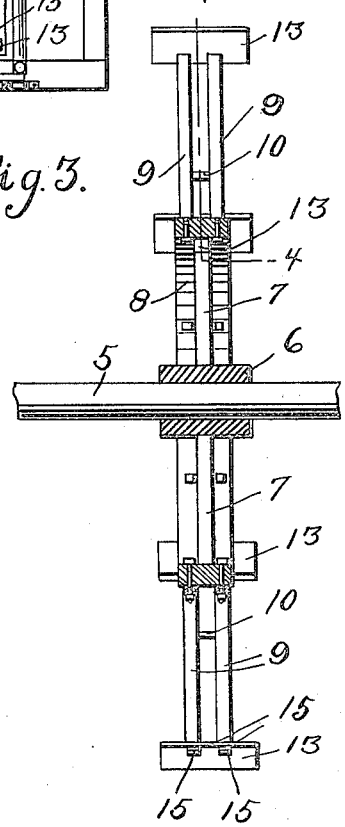
Fig. 3 is a sectional view on line 3—3 of Fig. 1.
Figure 4:
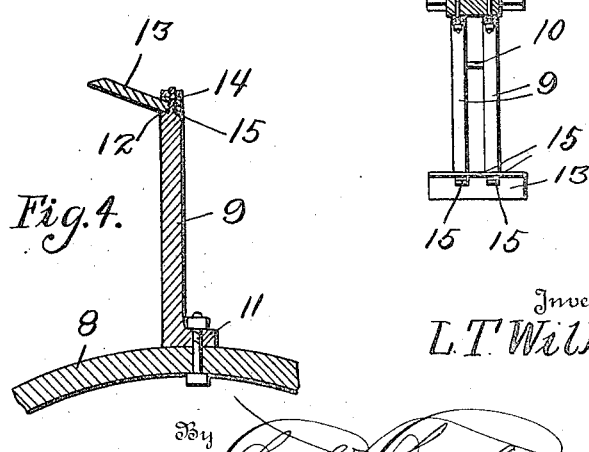
Fig. 4 is a sectional view on line 4—4 of Fig. 3.

Referring to the drawing 1 indicates a frame which is supported by its side bars on a wheeled axle 2, said axle having fixed thereon a beveled gear 3, which meshes with a similar gear 4 fixed upon the rear end of the longitudinal shaft 5.

The forward end of the shaft 5 is fixed in the hub 6 which has radiating therefrom spokes 7 which support the circular rim 8. A pair of arms 9 are provided and are braced by the bar 10, the inner ends of said arms being provided with feet 11 which are adapted to be bolted to the rim 8. The outer ends of the arms 9 are beveled, as at 12, and are engaged by the blades 13, said blades being held on the beveled ends of the arms 9 by bolts 14, which pass through the blades and are engaged by nuts 15.

The structure just described provides a novel form of chopping wheel and it will be obvious that any number of pairs of arms 9 may be employed and attached to the rim 8. By beveling the outer ends of the arms 9, the blades when bolted thereto assume angular relation so as to be more effective in the chopping operation. The forward bar of the frame 1 is supported by a spindle 16, which has its lower end provided with wheels 17, said spindle being slidably connected to the bar so that the frame can be moved upwardly and downwardly thereon in any suitable manner, whereby the cutting action of the chopping wheel can be regulated. Of course it will be understood that as the machine moves forwardly that the shaft 5 will be rapidly rotated, thus rotating the chopping wheel as is obvious.

What is claimed is:—

A chopping wheel comprising a hub, spokes radiating from the hub, blades carried by said spokes, a rim supported by the spokes, a plurality of pairs of arms, the arms of each pair being laterally spaced, and having their inner ends connected to the rim, and their outer ends beveled, said beveled outer ends being provided with integral threaded bolts, nuts engaged on the bolts to hold the adjacent surfaces of the blades flush against the beveled ends of the arms, and in angular relation to the arms.

In testimony whereof, I affix my signature, in the presence of two witnesses.

LESLIE T. WILKINS.

Witnesses:
W. L. G. UNGER,
JAS. PHILLIPS.

Copies of this patent may be obtained for five cents each, by addressing the "Commissioner of Patents, Washington, D. C."